US012607648B2

(12) United States Patent
Yan et al.

(10) Patent No.: US 12,607,648 B2
(45) Date of Patent: Apr. 21, 2026

(54) ACCELEROMETER

(71) Applicant: AAC Kaitai Technologies (Wuhan) CO., LTD., Wuhan (CN)

(72) Inventors: Shitao Yan, Wuhan (CN); Shan Yang, Wuhan (CN); Zhan Zhan, Wuhan (CN); Zhao Ma, Wuhan (CN); Xiao Kan, Wuhan (CN); Yang Li, Wuhan (CN); Veronica Tan, Singapore (SG); Kahkeen Lai, Singapore (SG); Hongtao Peng, Wuhan (CN); Houming Chong, Johor (MY); Zaixiang Pua, Singapore (SG)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 351 days.

(21) Appl. No.: 18/337,425

(22) Filed: Jun. 19, 2023

(65) Prior Publication Data

US 2024/0310407 A1     Sep. 19, 2024

Related U.S. Application Data

(63) Continuation of application No. PCT/CN2023/088511, filed on Apr. 14, 2023.

(30) Foreign Application Priority Data

Mar. 16, 2023     (CN) .......................... 202310275440.7

(51) Int. Cl.
G01P 15/125     (2006.01)
G01P 15/08     (2006.01)
G01P 15/18     (2013.01)

(52) U.S. Cl.
CPC ........ G01P 15/125 (2013.01); G01P 15/0802 (2013.01); G01P 15/18 (2013.01)

(58) Field of Classification Search
CPC ..... G01P 15/125; G01P 15/18; G01P 15/0802
See application file for complete search history.

(56) References Cited

U.S. PATENT DOCUMENTS

2008/0110260 A1*   5/2008   Konno ................... G01P 15/125
                                                           73/514.32
2010/0122579 A1*   5/2010   Hsu ......................... G01P 15/18
                                                           73/514.32

(Continued)

*Primary Examiner* — Helen C Kwok
(74) *Attorney, Agent, or Firm* — Wiersch Law Group

(57) ABSTRACT

An accelerometer includes a substrate. The substrate includes anchor points. An external coupling unit is annular and is parallel to the substrate. A first torsion plate is disposed on an inner side of the external coupling unit and is connected to the anchor points. Inner coupling beams are disposed on a side, close to the anchor points, of the first torsion plate. A second torsion plate is disposed on the inner side of the external coupling unit and is connected to the anchor points, the second torsion plate is connected to the first torsion plate through two of the inner coupling beams, the second torsion plate and the first torsion plate are mutually embedded, the first torsion plate and the second torsion plate are symmetrical about a first axis of symmetry. The accelerometer reduces cross coupling reduced, and accuracy and anti-interference performance of the accelerometer are improved.

13 Claims, 7 Drawing Sheets

(56)     References Cited

U.S. PATENT DOCUMENTS

| 2014/0298909 A1* | 10/2014 | Simoni | G01P 1/00 |
|---|---|---|---|
| | | | 73/514.32 |
| 2016/0334438 A1* | 11/2016 | Thompson | B81B 3/0086 |
| 2017/0363655 A1* | 12/2017 | Zhang | G01P 15/125 |
| 2018/0238925 A1* | 8/2018 | Acar | G01P 15/125 |
| 2018/0275161 A1* | 9/2018 | Tang | G01P 15/18 |
| 2020/0096538 A1* | 3/2020 | Zhang | G01P 15/125 |
| 2020/0355722 A1* | 11/2020 | Zou | G01P 15/18 |
| 2021/0072280 A1* | 3/2021 | Liukku | G01P 15/125 |
| 2023/0228788 A1* | 7/2023 | Yan | G01P 15/18 |
| | | | 73/514.01 |
| 2023/0228789 A1* | 7/2023 | Yan | G01P 15/0802 |
| | | | 73/514.32 |
| 2023/0228790 A1* | 7/2023 | Rytkönen | G01P 15/125 |
| | | | 73/514.35 |

* cited by examiner

ACCELEROMETER

TECHNICAL FIELD

The present disclosure relates to a field of acceleration measurement technology, and in particular to an accelerometer.

BACKGROUND

An accelerometer is generally used for various electronic devices, so that acceleration detection during equipment movement is realized, and various functions can be further realized. Currently, the accelerometer may perform differential detection by forming a differential capacitance. Specifically, a plurality of structures similar to a seesaw may be disposed, and differential detection is achieved by detecting rotation of the seesaw in the opposite direction, thereby generating cross coupling. On the other hand, the structures may be affected by stress due to deformation of a substrate, which interferes a test result, and detection precision and stability of the accelerometer are affected.

SUMMARY

The present disclosure provides an accelerometer to improve anti-interference and detection accuracy of the accelerometer.

The present disclosure provides an accelerometer, including a substrate, an external coupling unit, a first torsion plate, a second torsion plate, an external coupling elastic component, an in-plane detection device, and an out-of-plane detection device. The substrate includes anchor points. The external coupling unit is annular and is parallel to the substrate, and is configured as a co-inspection quality for XYZ three-axis detection. The first torsion plate is disposed on an inner side of the external coupling unit, the first torsion plate is connected to a first torsion beam, the first torsion beam is connected to the anchor points through a first connecting arm, inner coupling beams are disposed on a side, close to the anchor points, of the first torsion plate, and the inner coupling beams are respectively located on two sides of each of the anchor points in a second direction. The second torsion plate is disposed on the inner side of the external coupling unit, and the second torsion plate is connected to a second torsion beam, the second torsion beam is connected to the anchor points through a second connecting arm, the second torsion plate is connected to the first torsion plate through two of the inner coupling beams, the second torsion plate and the first torsion plate are mutually embedded to increase rotation radius of the first torsion plate and the second torsion plate, thereby improving sensitivity of acceleration detection of the accelerometer in a third direction, the first torsion plate and the second torsion plate are symmetrical about a first axis of symmetry, and the first axis of symmetry is parallel to a first direction. The external coupling elastic component is located between the first torsion plate and the external coupling unit, and is located between the second torsion plate and the external coupling unit, and is configured to provide elastic support for the external coupling unit. The in-plane detection device is disposed in the external coupling unit and is configured to detect movements of the external coupling unit in the first direction and the second direction, and the out-of-plane detection device is configured to detect movements of the first torsion plate and the second torsion plate in the third direction.

Furthermore, the first connecting arm and the second connecting arm are connected to a same one of the anchor points, or the first connecting arm and the second connecting arm are respectively connected to adjacent two of the anchor points.

Furthermore, the in-plane detection device includes a plurality of first capacitor plates and a plurality of second capacitor plates, the plurality of first capacitor plates and the plurality of second capacitor plates are respectively fixed to the substrate, the plurality of first capacitor plates are parallel to the second direction, and the plurality of second capacitor plates are parallel to the first direction. The plurality of first capacitor plates are disposed at intervals in the first direction and respectively cooperate with the external coupling unit to form a first differential detection capacitor. the plurality of second capacitor plates are disposed at intervals in the second direction, and respectively cooperate with the external coupling unit to form a second differential detection capacitor.

Furthermore, the out-of-plane detection device includes a third capacitor plate, the third capacitor plate is respectively spaced apart from the first torsion plate and the second torsion plate in the third direction, and forms a third differential detection capacitor with the external coupling unit. When the accelerometer detects a speed on the third direction, the first torsion plate and the second torsion plate respectively rotate in opposite directions, a first differential detection capacitor on an inner side of the first torsion plate and a second differential detection capacitor on an inner side of the second torsion plate perform a differential increase, a third differential detection capacitor on an outer side of the first torsion plate and a fourth differential detection capacitor on an outer side of the second torsion plate perform a differential decrease.

Furthermore, the third capacitor plates are respectively disposed between the first torsion beam and the second torsion beam along the first direction and disposed on two sides of the first torsion beam and the second torsion beam.

Furthermore, projections of the third capacitor plates in the third direction along the first direction are respectively located at two ends of the first torsion plate and two ends of the second torsion plate for improving sensitivity of changes of the third differential detection capacitor.

Furthermore, two of the third capacitor plates are disposed at one end, close to the anchor points, of the first torsion plate, and two of the third capacitor plates are disposed at one end, close to the anchor points, of the second torsion plate, the third capacitor plates are respectively located on two sides of the first connecting arm and the second connecting arm in the second direction, the third capacitor plates are symmetrical about a second axis of symmetry, and the second axis of symmetry is parallel to the second direction.

Furthermore, the accelerometer includes a cavity cover, and the third capacitor plates are fixed to the cavity cover and/or the substrate.

Furthermore, a first part of the external coupling elastic component is parallel to the first direction, and a second part of the external coupling elastic component is parallel to the second direction.

Furthermore, the first torsion plate includes a first connecting component, the second torsion plate includes a second connecting section, the first connecting section is configured to connect two ends of the first torsion plat along the first direction, and the second connecting section is configured to connect two ends of the second torsion plate along the first direction.

The present disclosure provides the accelerometer, including the substrate, the substrate includes anchor points, and the external coupling unit is annular and is parallel to the substrate. The first torsion plate is disposed on the inner side of the external coupling unit and is connected with the anchor points. The inner coupling beams are disposed on the side, close to the anchor points, of the first torsion plate. The second torsion plate is disposed on the inner side of the external coupling unit and is connected with the anchor points. The second torsion plate is connected with the first torsion plate through two of the inner coupling beams, the second torsion plate and the first torsion plate are mutually embedded, and the first torsion plate and the second torsion plate are symmetrical in the second direction. The first torsion beam and the second torsion beam are located on two sides of each of the inner coupling beam in the first direction and are respectively connected with the first torsion plate and the second torsion plate, and the first torsion plate and the second torsion plate may respectively rotate around the first torsion beam and the second torsion beam. The external coupling elastic component is configured to provide elastic support for the first torsion plate and the second torsion plate, and movements of the first torsion plate and the second torsion plate may be detected through the in-plane detection device and the out-of-plane detection device. According to the scheme provided by the disclosure, cross coupling may be reduced, and accuracy and anti-interference performance of the accelerometer are improved.

It should be understood that the above general description and the following detailed description are merely exemplary and cannot limit the present disclosure.

REFERENCE NUMERALS IN THE DRAWINGS

Figure 1:
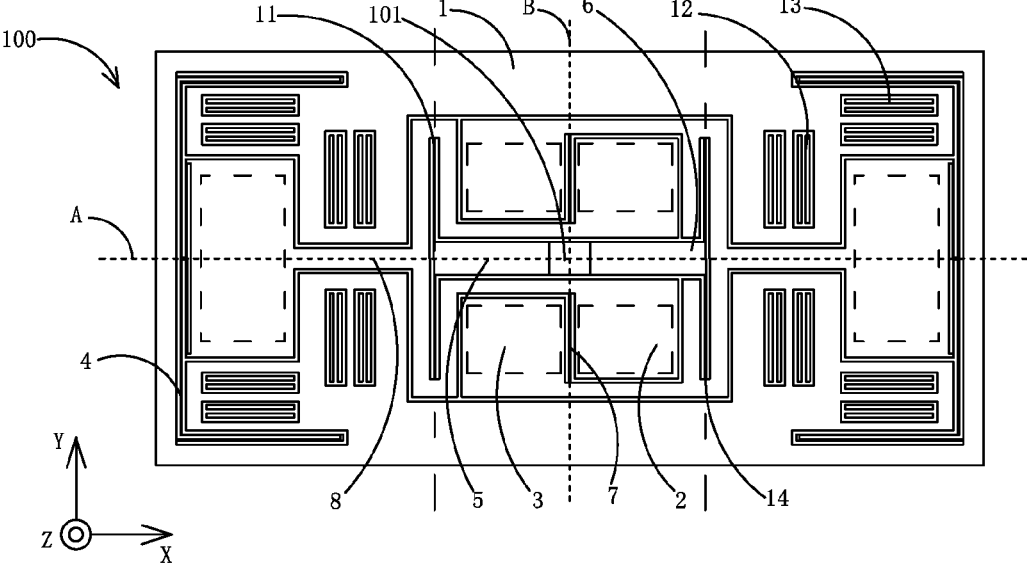
FIG. 1 is a structural schematic diagram of an accelerometer according to one embodiment of the present disclosure.

100—substrate;
101—anchor point;
1—external coupling unit;
11—first torsion beam;
12—first capacitor plate;
13—second capacitor plate;
14—second torsion beam;
2—first torsion plate;

3—second torsion plate;
4—external coupling elastic component;
5—first connecting arm;
6—second connecting arm;
7—inner coupling beam;
8—connecting section;
A—first axis of symmetry;
B—second axis of symmetry.

The accompanying drawings, which are incorporated in and constitute a part of this specification, illustrate embodiments consistent with the present disclosure and, together with the description, serve to explain the principles of the present disclosure.

DETAILED DESCRIPTION OF PREFERRED EMBODIMENTS

In order to better understand the technical solution of the present disclosure, the embodiments of the present disclosure are described in detail below in conjunction with the accompanying drawings.

It should be clear that the described embodiments are only a part of the embodiments of the present disclosure, not all of the embodiments. Based on the embodiments of the present disclosure, all other embodiments obtained by those who skilled in the art without creative efforts shall fall within the protection scope of the present disclosure.

The terminology used in the embodiments of the present disclosure is for the purpose of describing particular embodiments only and is not intended to be limiting of the present disclosure. As used in the embodiments of the present disclosure and the appended claims, the singular forms "a", "the", and "this" are also intended to include most forms unless the context clearly indicates other meanings.

It should be understood that the term "and/or" used herein is merely an association relationship describing an associated object, indicating that there may be three relationships, for example, A and/or B, which may be expressed as defining A alone, defining A and B at the same time, and defining B alone. In addition, character "/" in the text generally indicates that front-and-back associated object is an "or" relationship.

It should be noted that the terms "upper", "lower", "left", "right", etc. described in the embodiments of the present disclosure are described by the angle shown in the drawings, and should not be construed as limiting the embodiments of the present disclosure. In addition, in the context, it should also be understood that when one element is connected "on" or "down" the other element, it can not only be directly connected to the other element "up" or "down", but may also be indirectly connected to the other element "up" or "down" through the intermediate element.

Figure 2:
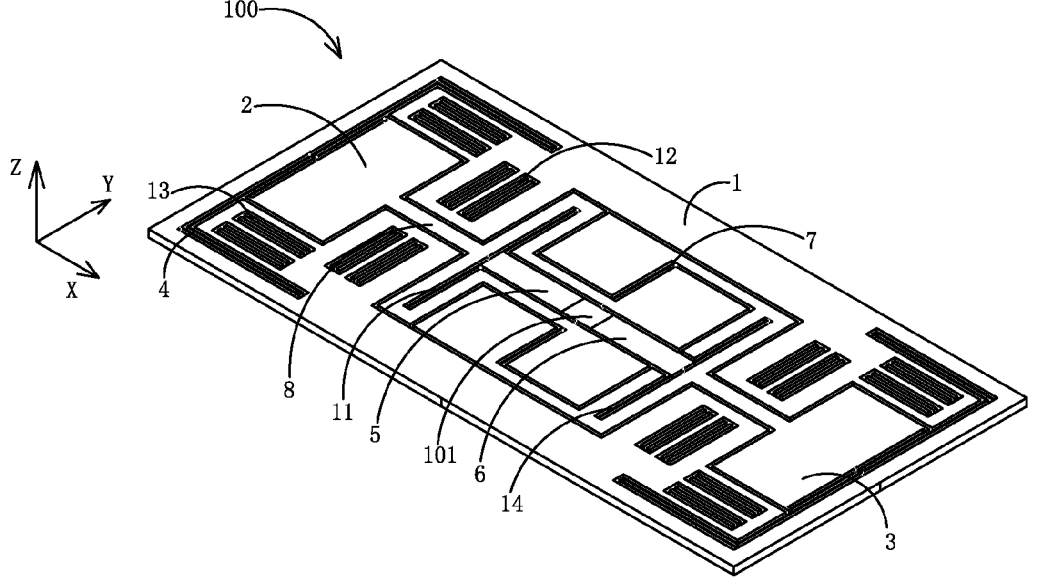
FIG. 2 is a structural schematic diagram of the accelerometer shown in another presentation angle according to one embodiment of the present disclosure.

As shown in FIG. 1 and FIG. 2, the accelerometer includes a substrate 100, an external coupling unit 1, a first torsion plate 2 and a second torsion plate 3. The substrate 100 has anchor points 101. The external coupling unit 1 is annular and is parallel to the substrate 100, and the external coupling unit 1 is configured as a co-inspection quality for XYZ three-axis detection. The first torsion plate 2 is disposed on an inner side of the external coupling unit 1, the first torsion plate 2 is connected to a first torsion beam 11, and the first torsion beam 11 is connected to the anchor points 101 through a first connecting arm 5. Inner coupling beams 7 are disposed on a side, close to the anchor points 101, of the first torsion plate 2, and the inner coupling beams 7 are located on two sides of the anchor points 101 in a second direction. The second torsion plate 3 is disposed on the inner side of the external coupling unit 1, the second torsion plate 3 is connected to a second torsion beam 14, and the second torsion beam 14 is connected to the anchor points 101 through a second connecting arm 6. The second torsion plate 3 is connected to the first torsion plate 2 through two of the inner coupling beams 7. The second torsion plate 3 and the first torsion plate 2 are mutually embedded, so that a rotation radius of the first torsion plate 2 and a rotation radius of the second torsion plate 3 are increased, and sensitivity of acceleration detection of the accelerometer in a third direction Z is improved. The first torsion plate 2 and the second torsion plate 3 are symmetrical in a second direction Y. An external coupling elastic component 4 is located between the first torsion plate 2 and the external coupling unit 1 and located between the second torsion plate 3 and the external coupling unit 1 and is configured to provide elastic support for the external coupling unit 1.

The accelerometer further includes an in-plane detection device and an out-of-plane detection device. The in-plane detection device is disposed on the external coupling unit 1 and is configured to detect movements of the external coupling unit 1 in a first direction X and the second direction Y. The out-of-plane detection device is configured to detect movements of the first torsion plate 2 and the second torsion plate 3 in the third direction Z.

Shape of the substrate 100 provided by the present disclosure is not limited, the substrate can be in other shapes such as a rectangle, and the substrate 100 includes anchor points 101. The external coupling unit 1 is located on the substrate 100 and parallel to the substrate 100, and the external coupling unit 1 is annular. Main inspection mass of the accelerometer is concentrated on the external coupling unit 1, so that the inspection quality structure disposed at other parts is reduced, and space is saved. The first torsion plate 2 and the second torsion plate 3 are disposed in the external coupling unit 1, and the first torsion plate 2 and the second torsion plate 3 can be matched with the out-of-plane detection device and is configured to detect acceleration on the third direction Z. The first torsion plate 2 is connected with the first torsion beam 11 and is capable of rotating around the first torsion beam 11. The second torsion plate 3 and the second torsion beam 14 are connected and are capable of rotating around the second torsion beam 14. The first torsion plate 2 and the second torsion plate 3 are mutually embedded, the first torsion plate 2 can be provided with a relatively protruding part, and the second torsion plate 3 can be provided with a relatively sunken part. When the accelerometer is in a stable state, protruding part can be located in concave part, so that mutual embedding of the first torsion plate 2 and the second torsion plate 3 is achieved, and the effect of saving space is achieved. The first torsion plate 2 and the second torsion plate 3 are symmetrically disposed along a first symmetry axis A, the external coupling units 1 are correspondingly and symmetrically disposed, and cross coupling during detection of the first torsion plate and the second torsion plate can be reduced.

Inner coupling beams 7 are disposed between the first torsion plate 2 and the second torsion plate 3, the inner coupling beams 7 and the second direction Y are parallel, and the inner coupling beams 7 and the second direction Y are disposed on the two sides of the anchor points 101 respectively. The inner coupling beams 7 are configured to detect the first torsion plate 2 and the second torsion plate 3, so that movements of the first torsion plate 2 and movements of the second torsion plate 3 are coupled. Two of the inner coupling beams 7 are symmetrically disposed in the second direction Y, so that cross coupling may be reduced, and cross coupling rejection ratio of the accelerometer during detection is improved. For example, when the acceleration in the first direction X is detected, the original first torsion plate 2 and the second torsion plate 3 may generate displacement in the first direction X, the first torsion plate and the second torsion plate can also generate displacement in the second direction Y, and this situation may be improved through two symmetrically-disposed inner coupling beams 7, so that the detection accuracy of the accelerometer is improved.

The in-plane detection device may be a capacitance detection device or an optical detection device. A detection result is obtained by detecting relative displacement of the first coupling unit 1 in the first direction X or the second direction Y. The out-of-plane detection device may be the capacitance detection device or the optical detection device, and the detection result is obtained by detecting the relative displacement of the rotation of the first torsion plate 2 and the second torsion plate 3 in the third direction Z.

As shown in FIG. 1 and FIG. 2, in one embodiment, the first connecting arm 5 and the second connecting arm 6 are connected with the same one of the anchor points 101, or the first connecting arm 5 and the second connecting arm 6 are respectively connected with adjacent two of the anchor points 101. When the accelerometer works, the substrate 100 may be affected by external factors, such as heat or stress, causing the substrate 100 to deform, which may cause the anchor point 101 provided on the substrate 100 to be affected. According to an embodiment of the present disclosure, the first torsion plate 2 can be connected with the first connecting arm 5 through the torsional spring, the first connecting arm 5 is connected with the anchor points 101. The second torsion plate 3 can be connected with the second connecting arm 6 through a torsional spring, and the second connecting arm 6 is connected with the same one of the anchor points 101 or is connected with adjacent two of the anchor points 101 respectively. The transmission of various stress of the substrate 100 through the anchor points 101 may be reduced, so that the influence of other structures on the substrate 100 is reduced, the stability and robustness of the accelerometer are improved, and the anti-interference performance on the stress generated by other deformation is improved. Therefore, the stability and anti-interference performance of the accelerometer during working are improved.

The first connecting arm 5 may improve the size of the first torsion plate 2 in the first direction X, and the second connecting arm 6 may improve the size of the second torsion plate 3 in the first direction X. When the accelerometer detects the acceleration in the third direction Z, the first torsion plate 2 rotates around the first torsion beam 11, and the second torsion plate 3 rotates around the second torsion beam 14, so that the rotation range of the first torsion plate 2 and the second torsion plate 3 may be widened, and the effect of improving the detection sensitivity is achieved.

As shown in FIG. 1 and FIG. 2, in one embodiment, the in-plane detection device includes a first capacitor plate 12 and a second capacitor plate 13, and the first capacitor plate 12 and the second capacitor plate 13 are fixed to the substrate 100 respectively. The first capacitor plate 12 is parallel to the second direction Y, and the second capacitor plate 13 is parallel to the first direction X. A plurality of first capacitor plates 12 are disposed at intervals in the first direction X and are respectively matched with the external coupling unit 1 to form a first differential detection capacitor. A plurality of second capacitor plates 13 are disposed at intervals in the second direction Y and are matched with the external coupling unit 1 to form a second differential detection capacitor.

Figure 3:
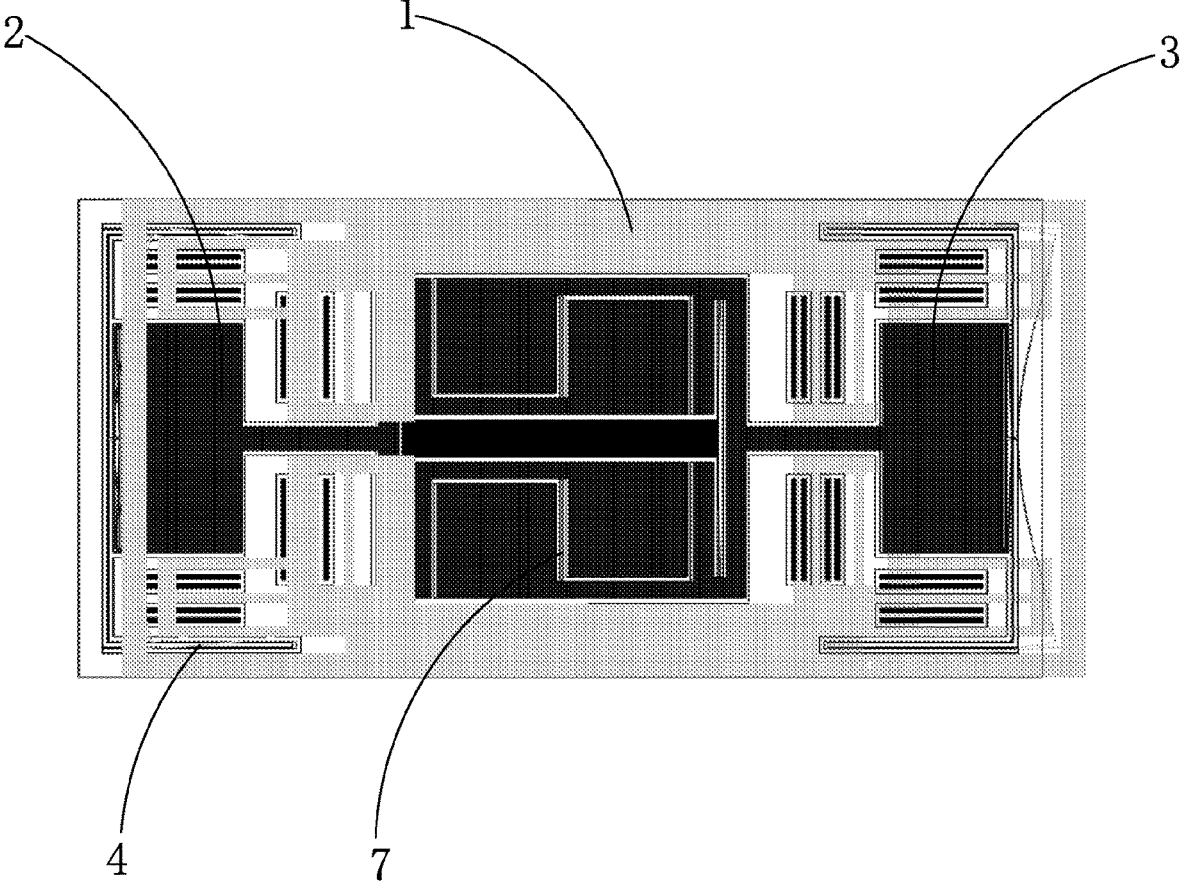
FIG. 3 is a simulation diagram of a detection mode of the accelerometer in a first direction according to one embodiment of the present disclosure.

As shown in FIG. 3, When the accelerometer detects the acceleration in the first direction X, the external coupling unit 1 may move in the first direction X under the action of inertia, thereby changing the distance between the external coupling unit 1 and the first capacitor plate 12, then, the first differential detection capacitor is changed, and the accelerometer may obtain a detection result by analyzing change of the first differential detection capacitor. The plurality of first capacitor plates 12 are disposed at intervals and can be matched with the external coupling unit 1 to form a plurality of first differential detection capacitors, so that accuracy and sensitivity of acceleration detection in the first direction X are improved.

Figure 4:
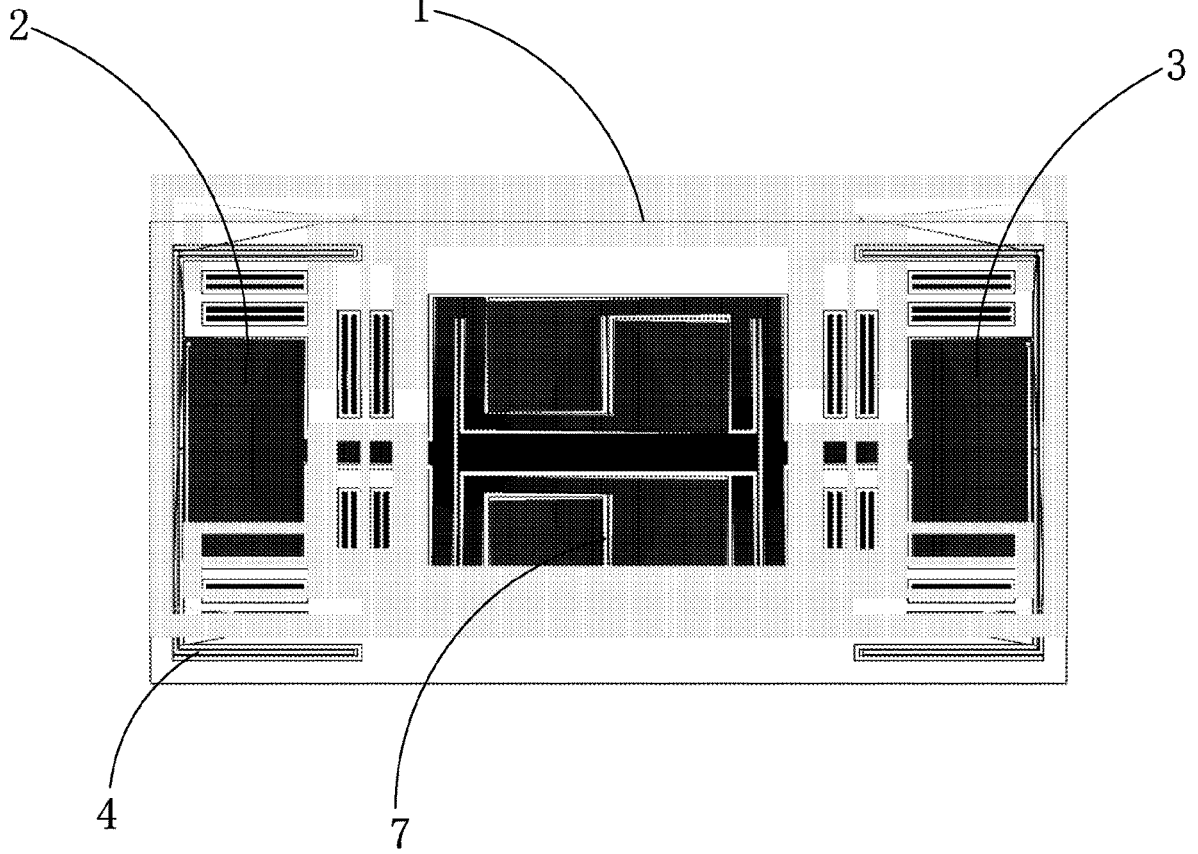
FIG. 4 is a simulation diagram of a detection mode of the accelerometer in a second direction according to one embodiment of the present disclosure.

As shown in FIG. 4, When the accelerometer detects the acceleration in the first direction X, the external coupling unit 1 can move in the first direction X under the action of inertia, so that distance between the external coupling unit 1 and the first capacitor plate 12 is changed, then the first differential detection capacitor is changed, and the accelerometer can obtain a detection result by analyzing the change of the first differential detection capacitor. The plurality of first capacitor plates 12 are disposed at intervals and can be matched with the external coupling unit 1 to form a plurality of first differential detection capacitors, so that the accuracy and sensitivity of acceleration detection in the first direction X are improved.

An avoidance hole or an avoidance groove may be defined on the external coupling unit 1, and the avoidance hole or the avoidance groove is configured to mount the first capacitor plate 12 and the second capacitor plate 13, so that the first capacitor plate 12 and the second capacitor plate 13 can be disposed inside the external coupling unit 1, thereby saving space.

In one embodiment, the out-of-plane detection device includes third capacitor plates, the third capacitor plates are respectively spaced apart from the first torsion plate 2 and the second torsion plate 3 in the third direction Z, and form a third differential detection capacitor with the third capacitor plates. When the accelerometer detects a speed on the third direction Z, the first torsion plate 2 and the second torsion plate 3 respectively rotate in opposite directions, when the first torsion plate 2 and the second torsion plate 3 rotate, a first differential detection capacitor on an inner side of the first torsion plate 2 and a second differential detection capacitor on an inner side of the second torsion plate 3 perform a differential increase, a third differential detection capacitor on an outer side of the first torsion plate 2 and a fourth differential detection capacitor on an outer side of the second torsion plate 3 perform a differential decrease.

When the acceleration in the third direction Z is detected, the first torsion plate 2 and the second torsion plate 3 may respectively rotate in opposite directions, so that the distance between the first torsion plate and each of the third capacitor plates is changed, and the third differential detection capacitor is further changed. By analyzing the change of the third differential detection capacitance, the accelerometer may obtain the detection result of the acceleration in the third direction Z.

As shown in FIG. 1, in one embodiment, the third capacitor plates are respectively disposed between the first torsion beam 11 and the second torsion beam 14 along the first direction X and disposed on two sides of the first torsion beam 11 and the second torsion beam 14.

Figure 5:
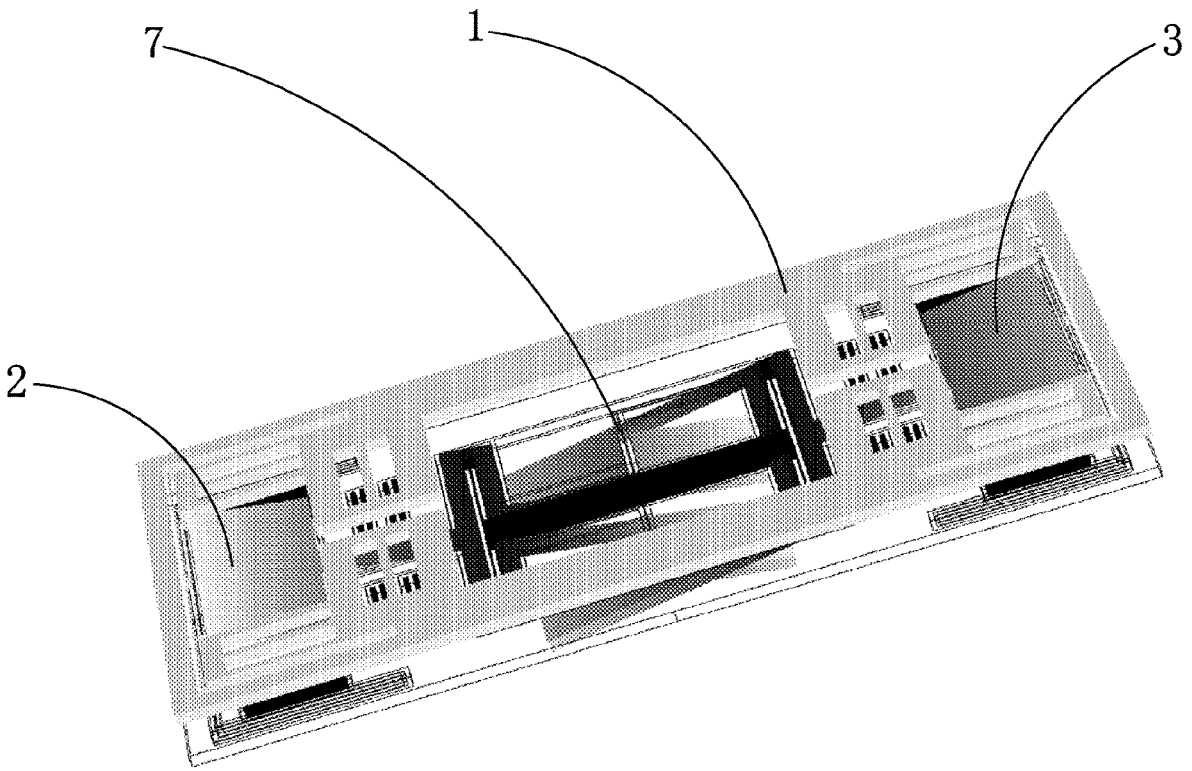
FIG. 5 is a simulation diagram of a detection mode of the accelerometer in a third direction according to one embodiment of the present disclosure.
Figure 6:
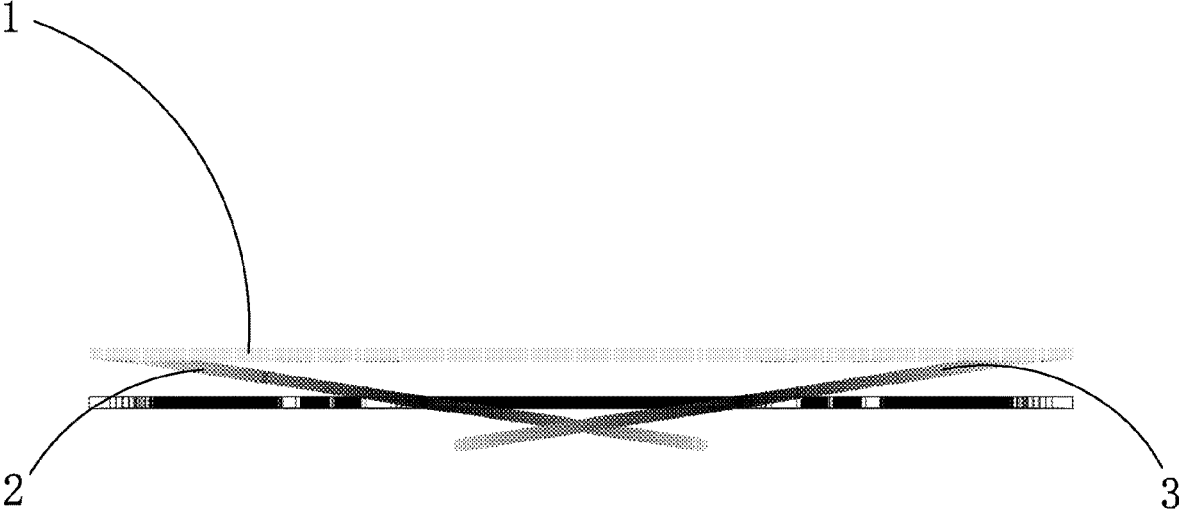
FIG. 6 is a simulation diagram of the detection mode of the accelerometer in the third direction shown in another presentation angle according to one embodiment of the present disclosure.

As shown in FIG. 5 and FIG. 6, the first torsion plate 2 may rotate around the first torsion beam 11, and the second torsion plate 3 may rotate around the second torsion beam 14. When the first torsion plate 2 and the second torsion plate 2 rotate, the movement directions of the first torsion plate 2 in two side parts of the first torsion beam 11 in the first direction X are opposite. For example, a part of the first torsion plate 2 on one side of the first torsion beam 11 in the first direction X rises, and a part on the other side of the first torsion beam 11 is reduced. The second torsion plate 3 may achieve a similar effect. A plurality of third electrodes (closed dotted line part is a projection position of the third capacitor polar plate) are respectively disposed on two sides of the first torsion beam 11 and the second torsion beam 14, and are disposed between the first torsion beam 11 and the second torsion beam 14. When the accelerometer detects the speed on the third direction Z, both the first torsion plate 2 and the second torsion plate 3 may achieve differential motion with the third capacitor plates, and a third differential detection capacitor is formed. The detection result may be obtained by detecting the third differential detection capacitor, and cross coupling may be reduced during detection, so that the detection precision is improved.

In one embodiment, projections of the third capacitor plates in the third direction Z along the first direction X are respectively located at two ends of the first torsion plate 2 and the two ends of the second torsion plate 3.

When the first torsion plate 2 and the second torsion plate 3 rotate by a certain angle, the position on the first torsion plate 2 is farther from the first torsion beam 11, and the displacement of the position in the third direction Z is larger. When the projections of the third capacitor plates in the third direction Z is located at the two ends of the first torsion plate 2 and the two ends of the second torsion plate 3 in the first direction X, large relative displacement can be generated, so that the change amount of the third differential detection capacitor is improved. Therefore, the sensitivity of the speedometer to the third direction Z acceleration detection is improved.

In one embodiment, one end, close to the anchor points 101, of the first torsion plate 2 and one end, close to the anchor points 101, of the second torsion plate 3 are correspondingly provided with two of the third capacitor plates, the third capacitor plates are respectively located on two sides of the first connecting arm 5 and the second connecting arm 6 in the second direction Y, the third capacitor plates are symmetrical about a second axis of symmetry B, and the second axis of symmetry is parallel to the second direction Y.

The third capacitor plates are correspondingly disposed at the mutually embedded positions of the first torsion plate 2 and the second torsion plate 3, so that the space is saved. A plurality of the third capacitor plates are symmetrically disposed, so that the plurality of third capacitor plates may be matched with the first torsion plate 2 and the second torsion plate 3 at the same time to form a plurality of groups of differential detection capacitors, and acceleration detection in the third direction Z may be conveniently realized.

In one embodiment, the accelerometer includes a cavity cover, and the third capacitor plate is fixed to the cavity cover and/or the substrate 100.

The third capacitor plates may be fixed to the inner wall of the cavity cover and/or the substrate 100 in an adhering manner. When the accelerometer is in a stable state, the third capacitor plates and the first torsion plate 2 and the second torsion plate 3 are spaced apart from each other and are parallel to each other. The third capacitor plates may be matched with the first torsion plate 2 and the second torsion plate 3 to form a differential detection capacitor.

As shown in FIG. 1 and FIG. 2, in one embodiment, a first part of the external coupling elastic component 4 is parallel to the first direction X, and a second part of the external coupling elastic component 4 is parallel to the second direction Y.

A portion, parallel to the first direction X, of the external coupling elastic component 4 and a portion, parallel to the second direction Y, of the external coupling elastic component 4 may achieve the elastic supporting effect on the first torsion plate 2 and the second torsion plate 3 at the same time, so that the first torsion plate and the second torsion plate may achieve a movement mode in the first direction X and the second direction Y. Moreover, when the first torsion plate 2 and the second torsion plate 3 coaxially move around the first torsion beam 11 in the third direction Z, the first torsion plate 2 and the second torsion plate 3 are coupled.

Figure 7:
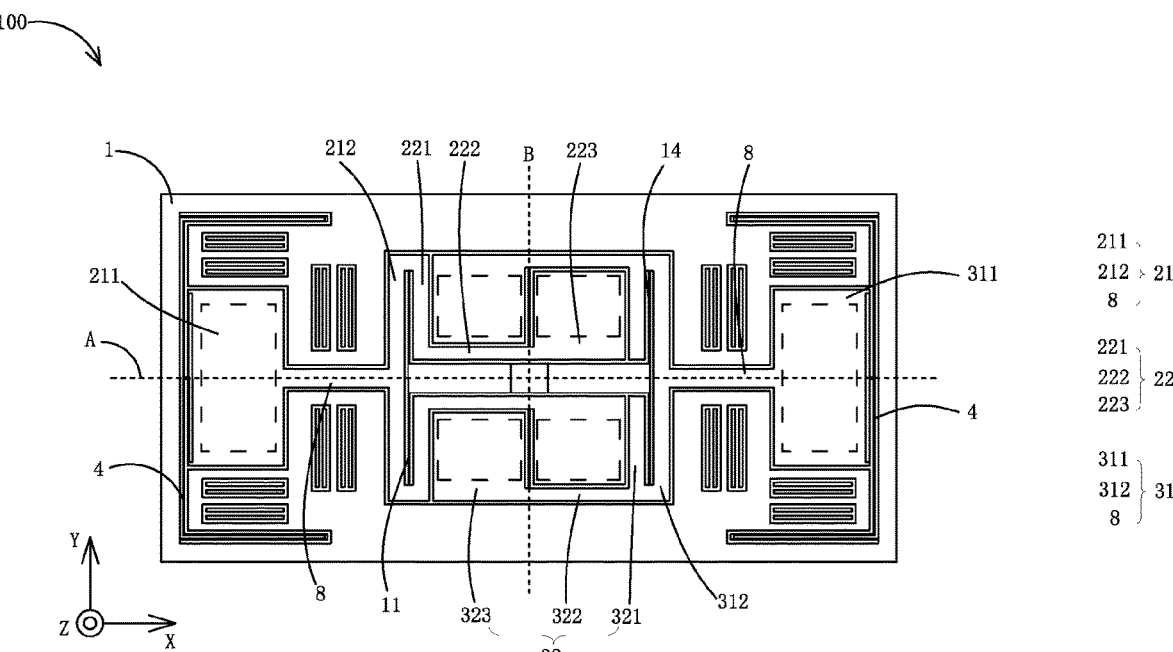
FIG. 7 is a structural schematic diagram of an accelerometer according to one embodiment of the present disclosure.

In one embodiment, the first torsion plate 2 includes a first connecting section 8, and the second torsion plate 3 includes a second connecting section 8, and the first connecting section 8 and the second connecting section 8 are configured to respectively connect two ends of the first torsion plate 2 in the first direction X, and the connecting sections 8 are configured to connect two ends of the second torsion plate 3 in the first direction X. Besides, as shown in FIG. 7, the first torsion plate 2 further includes a first torsion portion 21 located on one side of the first torsion beam 11 along the first direction X, and two second torsion portions 22 located on the other side of the first torsion beam 11 along the first direction X. The first torsion portion 21 includes a first torsion section 211 connected to the external coupling elastic component 4, a first connecting section 8 extended from the first torsion section 211 along the first direction X, and two first bending sections 212 bended from one end of the first connecting section 8 away from the first torsion section 211 and extended along opposite directions parallel to the second direction Y. Each second torsion portion 22 includes a second bending section 221 parallel to the first bending section 212, a third bending section 222 bended from the second bending section 221 and extended along the first direction X, and a second torsion section 223 connected to the third bending section 222. The second torsion plate 3 includes a third torsion portion 31 located on one side of the second torsion beam 14 along the first direction X, and two fourth torsion portions 32 located on the other side of the second torsion beam 14 along the first direction X. Third torsion portion 31 includes a third torsion section 311 connected to the external coupling elastic component 4, a second connecting section 8 extended from the third torsion section 311 along the first direction X, and two fourth bending sections 312 bended from one end of the second connecting section 8 away from the third torsion section 311 and extended along opposite directions parallel to the second direction Y. Each fourth torsion portion 32 includes a fifth bending portion 321 parallel to the fourth bending section 312, a sixth bending section 322 extended along the first direction X, and a fourth torsion section 323 connected to the sixth bending section 322.

The connecting sections 8 is configured to connect the two ends of the first torsion plate 2 and connect the two ends of the second torsion plate 3. Due to a fact that the portions, at the two ends of the first torsion plate 2 and the second torsion plate 3 need to be matched with the third capacitor plates, large sizes are needed in the first direction X and the second direction Y, and enough area mutual cooperation is achieved. The connecting sections 8 may save space while playing a connecting role, so that the external coupling unit 1 may have a larger size in the first direction X and the second direction Y, and the first torsion plate 2 and the second torsion plate 3 may be conveniently disposed on the external coupling unit 1. Moreover, the main inspection mass of the accelerometer is distributed on the external coupling unit 1, so that the space may be saved on the premise of ensuring the detection sensitivity of the accelerometer.

The present disclosure provides the accelerometer, including the substrate 100, the substrate 100 includes anchor points 101, and the external coupling unit 1 is annular and is parallel to the substrate 100. The first torsion plate 2 is disposed on the inner side of the external coupling unit 1 and is connected to the anchor point 101. Inner coupling beams 7 are disposed on the side, close to the anchor points 101, of the first torsion plate 2. The second torsion plate 3 is disposed on the inner side of the external coupling unit 1 and is connected to the anchor points 101. The second torsion plate 3 is connected to the first torsion plate 2 through two of the inner coupling beams 7, the second torsion plate 3 and the first torsion plate 2 are mutually embedded, and the first torsion plate 2 and the second torsion plate 3 are symmetrical in the second direction Y. The first torsion beam 11 and the second torsion beam 14 are located on the two sides of the inner coupling beam 7 in the first direction and are respectively connected with the first torsion plate 2 and the second torsion plate 3, and the first torsion plate 2 and the second torsion plate 3 may respectively rotate around the torsion beam 11. The external coupling elastic component 4 is configured to provide elastic support for the first torsion plate 2 and the second torsion plate 3, and movements of the first torsion plate 2 and the second torsion plate 3 may be detected through the in-plane detection device and the out-of-plane detection device. According to the scheme provided by the disclosure, cross coupling can be reduced, and accuracy and anti-interference performance of the accelerometer are improved.

The above is only the preferred embodiment of the present disclosure, and is not used for limiting the present disclosure. For those who skilled in the art, the present disclosure can have various changes and changes. Any modification, equivalent replacement, improvement and the like made within the spirit and principle of the present disclosure should be included within the protection scope of the present disclosure.

What is claimed is:

1. An accelerometer, comprising:

a substrate (100) comprising an anchor point (101);

an external coupling unit (1) parallel to the substrate (100) and configured as a co-inspection quality for XYZ three-axis detection, including an avoidance hole in the middle;

a first torsion plate (2) located in the avoidance hole, connected to the anchor point (101) through a first torsion beam (11);

a second torsion plate (3) located in the avoidance hole, connected to the anchor point (101) through a second torsion beam (14);

two external coupling elastic components (4) configured to provide elastic support for the external coupling unit (1), one of the external coupling elastic components configured to connect the first torsion plate (2) and the external coupling unit (1), the other of the external coupling elastic components configured to connect the second torsion plate (3) with the external coupling unit (1);

an in-plane detection device disposed in the external coupling unit (1), configured to detect movements of the external coupling unit (1) in a first direction (X) and a second direction (Y); and an out-of-plane detection device configured to detect movements of the first torsion plate (2) and the second torsion plate (3) in a third direction (Z); wherein the external coupling unit (1) is in a rectangular shape and provided with a first central axis (A) parallel to the first direction (X) and a second central axis (B) parallel to the second direction (Y), a symmetry center of the external coupling unit (1) is overlapped with a symmetry center of the anchor point (101);

the first torsion plate (2) and the second torsion plate (3) are axially symmetrical about the first central axis (A) respectively;

the first torsion beam (11) and the second torsion beam (14) are both extended along the second direction (Y); the first torsion plate (2) and the second torsion plate (3) is connected through an inner coupling beam (7) extended along the second direction (Y); when an acceleration in the third direction (Z) is detected, the first torsion plate (2) is configured to rotate around the first torsion beam (11), and the second torsion plate (3) is configured to rotate around the second torsion beam (14); the first torsion plate (2) and the second torsion plate (3) rotates in opposite directions; along the second direction (Y), a projection of the first torsion plate (2) is overlapped with a projection of the second torsion plate (3), the first torsion plate (2) and the second torsion plate (3) are mutually embedded to increase rotation radius of the first torsion plate (2) and the second torsion plate (3), thereby improving sensitivity of acceleration detection of the accelerometer in a third direction (Z).

2. The accelerometer according to claim 1, wherein the first torsion beam (11) is connected to the anchor point (101) through a first connecting arm (5), the second torsion beam (14) is connected to the anchor point (101) through a second connecting beam (6), the first connecting arm (5) and the second connecting arm (6) are both extended along the first direction (X), and connected to two ends of the anchor point (101) along the first direction (X) respectively.

3. The accelerometer according to claim 2, wherein the first torsion plate (2) comprises a first torsion portion located on one side of the first torsion beam (11) along the first direction (X), and two second torsion portions located on the other side of the first torsion beam (11) along the first direction (X); the first torsion portion is connected to the external coupling unit (1) through the external coupling elastic component (4), the two second torsion portions are axially symmetrical along the first central axis (A) and located at two opposite sides of the anchor point (101) along the second direction (Y); when the acceleration in the third direction (Z) is detected, the first torsion portion and each second torsion portion are configured to move along opposite directions parallel to the third direction (Z);

the second torsion plate (3) comprises a third torsion portion located on one side of the second torsion beam (14) along the first direction (X), and two fourth torsion portions located on the other side of the second torsion beam (14) along the first direction (X); the third torsion portion is connected to the external coupling unit (1) through the external coupling elastic component (4), the two fourth torsion portions are axially symmetrical along the first central axis (A) and located at two opposite sides of the anchor point (101) along the second direction (Y); when the acceleration in the third direction (Z) is detected, the third torsion portion and each fourth torsion portion are configured to move along opposite directions parallel to the third direction (Z);

the second torsion portions and the fourth torsion portions located at same side of the first central axis are mutually embedded to increase rotation radius of the first torsion plate (2) and the second torsion plate (3), thereby improving sensitivity of acceleration detection of the accelerometer in a third direction (Z).

4. The accelerometer according to claim 3, wherein the first torsion portion and the third torsion portion are axially symmetrical about the second central axis (B); the second torsion portions and the fourth torsion portions located at same side of the first central axis (A) are rotatory symmetric about the second central axis (B); the second torsion portions and the fourth torsion portions located at the same side of the first central axis (A) are connected by the inner coupling beam (7).

5. The accelerometer according to claim 4, wherein the first torsion portion comprises a first torsion section connected to the external coupling elastic component (4), a first connecting section (8) extended from the first torsion section along the first central axis (A), and two first bending sections bended from one end of the first connecting section (8) away from the first torsion section and extended along opposite directions parallel to the second direction (Y);

the first connecting arm, the anchor point, and the second connecting arm are located between the two second torsion portions;

each second torsion portion comprises a second bending section parallel to the first bending section, a third bending section bended from the second bending section and extended along the first direction (X), and a second torsion section connected to the third bending section; the first bending section and the second bending section are located on opposite sides of the first torsion beam (11) along the first direction (X); one end of the first torsion beam (11) is connected to a juncture of the first bending section and the second bending section, the other end of first torsion beam (11) is connected to an end of the first connecting arm (5) away from the anchor point (101); the third bending section are opposite to the first connecting arm at an interval along the second direction (Y); the third bending section is connected to an end of the second bending section closer to the first connecting arm (5).

6. The accelerometer according to claim 5, wherein the third torsion portion comprises a third torsion section connected to the external coupling elastic component (4), a second connecting section extended from the third torsion section along the first central axis (A), and two fourth bending sections bended from one end of the second connecting section away from the third torsion section and extended along opposite directions parallel to the second direction (Y).

7. The accelerometer according to claim 6, wherein the third bending section and the second torsion section are located between the anchor point (101) and the four torsion portions; each fourth torsion portion comprises a fifth bending portion parallel to the fourth bending sections, a sixth bending section extended along the first direction (X), and a fourth torsion section connected to the sixth bending section; the fourth bending section and the fifth bending portion are located at opposite sides of the second torsion beam (14) along the first direction (X); one end of the second torsion beam (14) is connected to a juncture of the fourth bending sections and the fifth bending portion, the other end of second torsion beam (14) is connected to an end of the second connecting arm (6) away from the anchor point (101); the sixth bending section is connected to an end of the fifth bending portion away from the second connecting arm (6).

8. The accelerometer according to claim 7, wherein the third bending section and the sixth bending section located at the same side of the second central axis (B) is connected through the inner coupling beam (7); the second torsion section and the fourth torsion section located on the same side of the second central axis (B) are located at opposite sides of the inner coupling beam (7) along the first direction (X).

9. The accelerometer according to claim 7, wherein a first concave portion is enclosed jointly by the second bending section, the third bending section, and the second torsion section; the fourth torsion section is received in the first concave portion; a second concave portion is enclosed jointly by the fifth bending portion, the sixth bending section, and the fourth torsion section; the second torsion section is received in the second concave portion.

10. The accelerometer according to claim 3, wherein the in-plane detection device comprises a plurality of first capacitor plates (12) and a plurality of second capacitor plates (13), the plurality of first capacitor plates (12) and the plurality of second capacitor plates (13) are respectively fixed to the substrate (100), the plurality of first capacitor plates (12) are parallel to the second direction (Y), and the plurality of second capacitor plates (13) are parallel to the first direction (X);

the plurality of first capacitor plates (12) are disposed at intervals in the first direction (X) and respectively cooperate with the external coupling unit (1) to form a first differential detection capacitor; and the plurality of second capacitor plates (13) are disposed at intervals in the second direction (Y), and respectively cooperate with the external coupling unit (1) to form a second differential detection capacitor.

11. The accelerometer according to claim 7, wherein the out-of-plane detection device comprises a third capacitor plate, the third capacitor plate is respectively spaced apart from the first torsion plate (2) and the second torsion plate (3) in the third direction (Z), and forms a third differential detection capacitor with the external coupling unit (1); and when the first torsion plate (2) and the second torsion plate (3) respectively rotate in opposite directions, a first differential detection capacitor on an inner side of the first torsion plate (2) and a second differential detection capacitor on an inner side of the second torsion plate (3) perform a differential increase, a third differential detection capacitor on an outer side of the first torsion plate (2) and a fourth differential detection capacitor on an outer side of the second torsion plate (3) perform a differential decrease.

12. The accelerometer according to claim 11, wherein the out-of-plane detection device comprises six third capacitor plates; two third capacitor plates are respectively disposed corresponding to the first torsion section and the third torsion section; each second torsion section and each fourth torsion section are opposite to a respective one third capacitor plate along the third direction (Z) for improving sensitivity of changes of the third differential detection capacitor.

13. The accelerometer according to claim 11, wherein the accelerometer comprises a cavity cover, and the third capacitor plate is fixed to the cavity cover and/or the substrate (100).

\* \* \* \* \*